United States Patent [19]

Sugiyama

[11] Patent Number: 4,721,373
[45] Date of Patent: Jan. 26, 1988

[54] LENS SYSTEM FOR USE WITH AN OPTICAL DISK

[75] Inventor: Takahiro Sugiyama, Tokyo, Japan
[73] Assignee: Asahi Kogaku Kogyo Kabushiki Kaisha, Tokyo, Japan
[21] Appl. No.: 931,821
[22] Filed: Nov. 18, 1986
[30] Foreign Application Priority Data
Nov. 19, 1985 [JP] Japan ................. 60-260644
[51] Int. Cl.$^4$ ................................. G02B 9/10
[52] U.S. Cl. .................................... 350/482
[58] Field of Search .............. 350/482, 470, 475
[56] References Cited
U.S. PATENT DOCUMENTS
4,384,766  5/1983  Tokuhara .................. 350/475
4,632,520  12/1986  Yamakawa ............... 350/470

Primary Examiner—John K. Corbin
Assistant Examiner—Rebecca D. Gass
Attorney, Agent, or Firm—Sughrue, Mion, Zinn, Macpeak and Seas

[57] ABSTRACT

A lens system for use with an optical disk consisting of a positive lens (+) and a negative lens (−) cemented to the positive lens satisfying the conditions of $\nu_+ - \nu_- > 20$,
$\Delta N_+ / \Delta N_- < 0.1$ and
$\Delta N_- > 0$ where $\nu$ is the Abbe number and $\Delta N$ is the temperature coefficient of the refractive index, whereby the temperature and wavelength dependence of the focal length is minimized.

7 Claims, 10 Drawing Figures

LENS SYSTEM FOR USE WITH AN OPTICAL DISK

BACKGROUND OF THE INVENTION

1. Field of the Invention

The present invention relates to a lens system for use with an optical disk which is a high-density information recording medium.

2. Background of the Invention

A lens system which is used to read high-density information from an optical disk or to write such information into the disk is required to have a resolution of the order of 1 micrometer in order to detect high-density signals. However, the laser used as a light source for the operation of the optical disk sometimes experiences variations in wavelength and the variations may cause displacement of the focal point or aberrational variations, which will become a problem depending on the precision required of the optical disk.

The environment in which the lens system for use with an optical disk is put to service varies from time to time because the temperature to which the optical disk equipment is exposed undergoes great variations. Therefore, if the variations in temperature are extensive or if high precision is required for the operation of the optical disk, the displacement in focal point or aberrational variations that occur on account of such temperature variations will present a definite problem.

Most of the lens systems proposed to data for use with optical disks have been designed without taking into consideration the possibility of variations in wave-length (i.e., chromatic aberration) and temperature.

SUMMARY OF THE INVENTION

An object, therefore, of the present invention is to provide a lens system for use with an optical disk that is capable of minimizing the possible displacement of focal point and aberrational variations due to fluctuations in the wavelength of a light source not only by means of incorporating a capacity for compensating the aberrations at more than one wavelength but also by minimizing the displacement of focal point and aberrational variations that may occur as a result of temperature variations.

The invention can be summarized as a lens system, particularly appropriate for use with an optical disk, composed of a single lens unit of a positive lens element cemented to a negative lens element. The difference of the Abbe numbers must be greater than 20. The ratio of the temperature coefficient of the refractive index must be less than 0.1 with that of the negative lens element being positive.

DETAILED DESCRIPTION OF THE PREFERRED EMBODIMENTS

Figure 1:
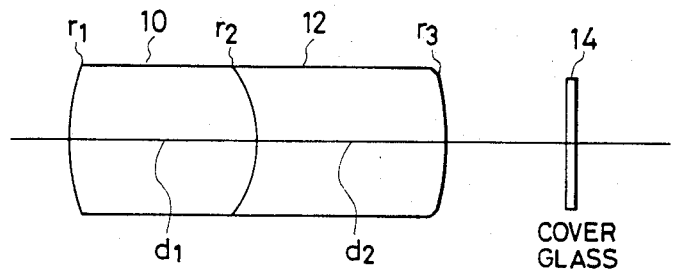
FIG. 1 shows in cross section the lens arrangement employed in the first embodiment of the present invention.
Figure 3:
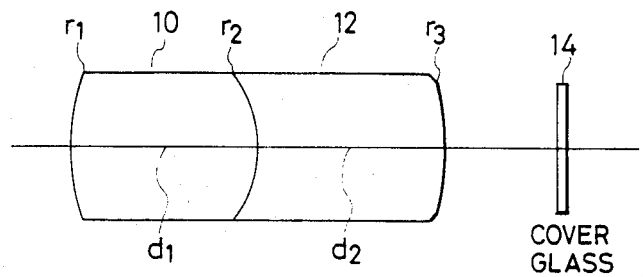
FIG. 3 shows in cross section the lens arrangement employed in the second embodiment of the present invention.
Figure 5:
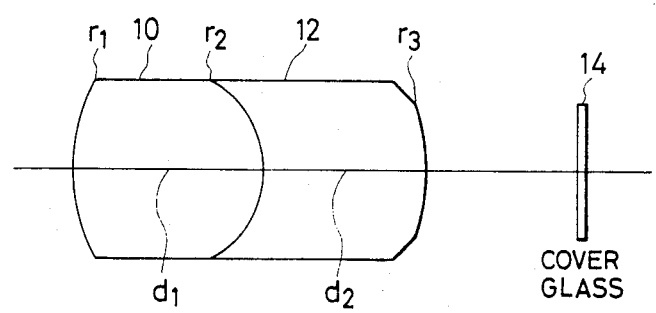
FIG. 5 shows in cross section the lens arrangement employed in the third embodiment of the present invention.
Figure 7:
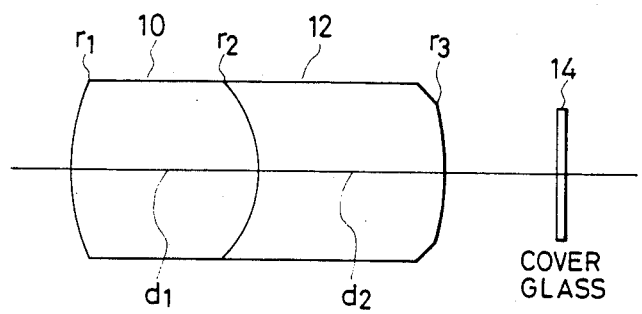
FIG. 7 shows in cross section the lens arrangement employed in the fourth embodiment of the present invention.
Figure 9:
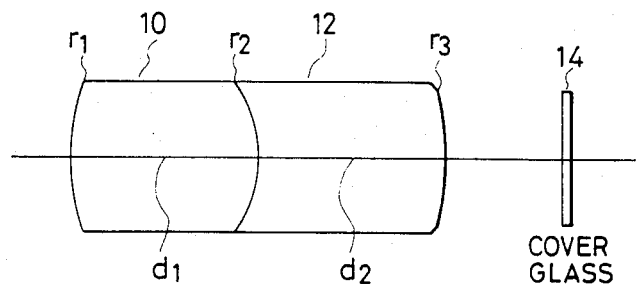
FIG. 9 shows in cross section the lens arrangement employed in the fifth embodiment of the present invention.

The lens system for use with an optical disk in accordance with the present invention is, as shown in any of FIGS. 1, 3, 5, 7 and 9, composed of a single lens unit wherein a positive lens element 10 is cemented to a negative lens element 12. A cover glass 14 is on the same side of the lens unit as the optical disk on which the lens unit focuses light. It protects the lens unit from dust and the like. The lens system is characterized by the following two conditions:

(1) $\nu_+ - \nu_- > 20$; and (2) $\Delta N_+ \Delta N_- < 0.1$ and $\Delta N_- > 0$ wherein $\nu_+$ is the Abbe number of the positive lens element 10, $\nu_-$ is the Abbe number of the negative lens element 12, $\Delta N_+$ is the temperature coefficient of the refractive index of the positive lens element 10, and $\Delta N_-$ is the temperature coefficient of the refractive index of the negative lens element 12. The Abbe number is the well known parameter of the chromatic dispersion of an optical glass material.

The conditions that must be satisfied by the lens system of the present invention are described below.

Condition (1) must be satisfied in order to compensate for the chromatic aberration or for the displacement of focal point and aberrational variations, which are caused by variations in wave-length. If this condition is not met, the intended compensation of chromatic aberrations cannot be achieved.

Condition (2) must be satisfied in order to compensate for the displacement of the focal point (i.e. focal length) and aberrational variations that are caused by variations in temperature. The optical glass employed in most convergent lens systems has a positive linear expansion coefficient, so that at elevated temperatures the back focus will be increased as a result of changes in the radius of curvature and be decreased as a result of changes in the lens thickness. Therefore, by properly controlling the changes in the radius of curvature and in the lens thickness, the variation in back focus can be adjusted to substantially zero. However, the lens barrel and other elements provided in the lens system in addition to the lens elements will expand at elevated temperatures to increase the distance between each lens element and the focal point. In consideration of this phenomenon, the lens system of the present invention is so designed that at elevated temperatures the refractive index of each lens element will be changed to increase the back focus, thereby minimizing the displacement of the focal point of the overall lens system that will occur as a result of variations in temperature.

It is generally held that if the refractive index of a positive lens element is increased, the back focus will be decreased while the back focus is increased if the refractive index of a negative lens element is increased. Therefore, it is desired that a positive lens element is made of a glass material having a small temperature coefficient while a negative lens element is formed of a glass material having a large temperature coefficient. If $\Delta N_+/\Delta N_-$ in condition (2) is equal to or greater than 0.1, there occurs an undesirable change in refractive index at elevated temperatures to decrease the back focus. If $\Delta N_-$ is equal to or less than zero, there also occurs an undesirable change in refractive index at elevated temperatures to decrease the back focus. At lower temperatures, the refractive index will change in the opposite way to increase the back focus if condition (2) is not met.

Data for five specific embodiments of the present invention are presented in Tables 1 to 5. In these table the focal length f is set to 1 which means the other lengths are in fact normalized to the focal length. In these tables, r signifies the radius of curvature of an individual lens surface, d is the aerial distance between adjacent lens surfaces, N is the refractive index of each lens element, $\nu$ is the Abbe number of each lens element, and $\Delta N$ signifies the temperature coefficient of the refractive index, in units of $10^{-6}/°C$.

Figure 2:
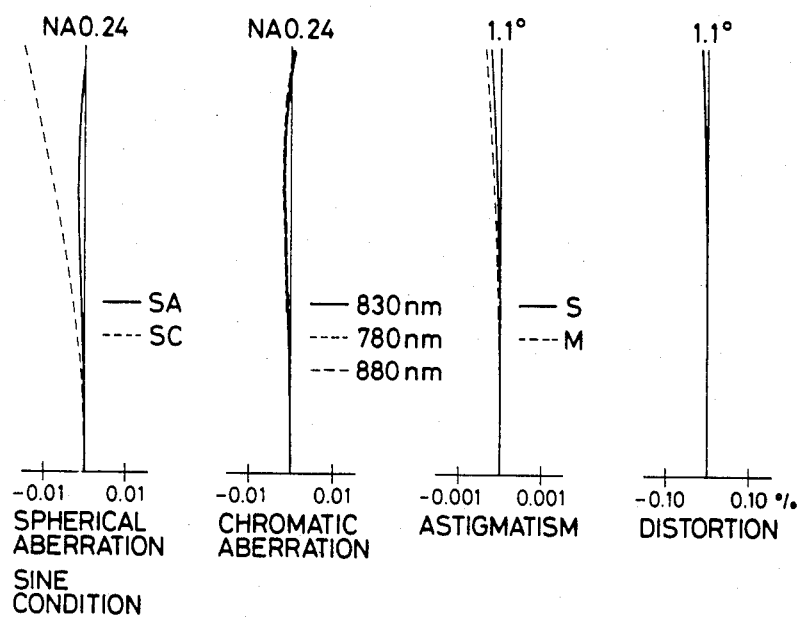
FIG. 2 is a diagram plotting the aberrational curves obtained by the first embodiment of the present invention.
Figure 4:
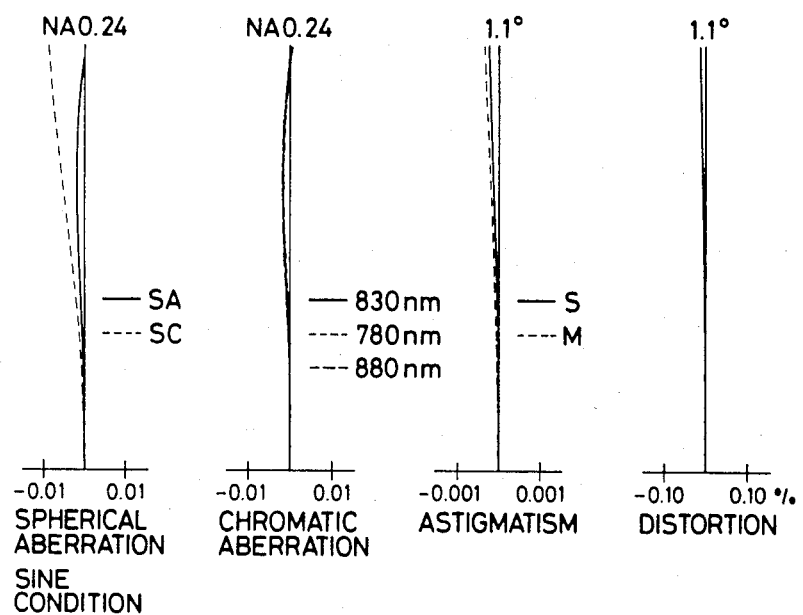
FIG. 4 is a diagram plotting the aberrational curves obtained by the second embodiment of the present invention.
Figure 6:
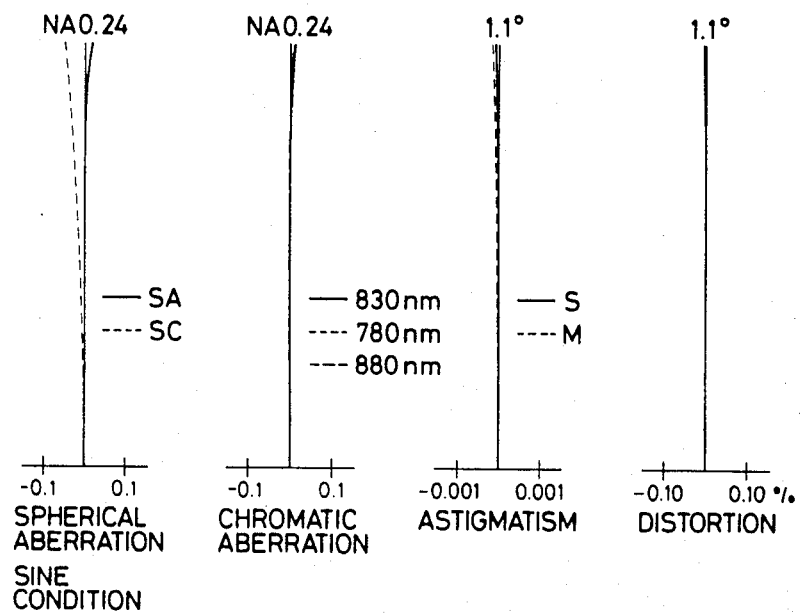
FIG. 6 is a diagram plotting the aberrational curves obtained by the third embodiment of the present invention.
Figure 8:
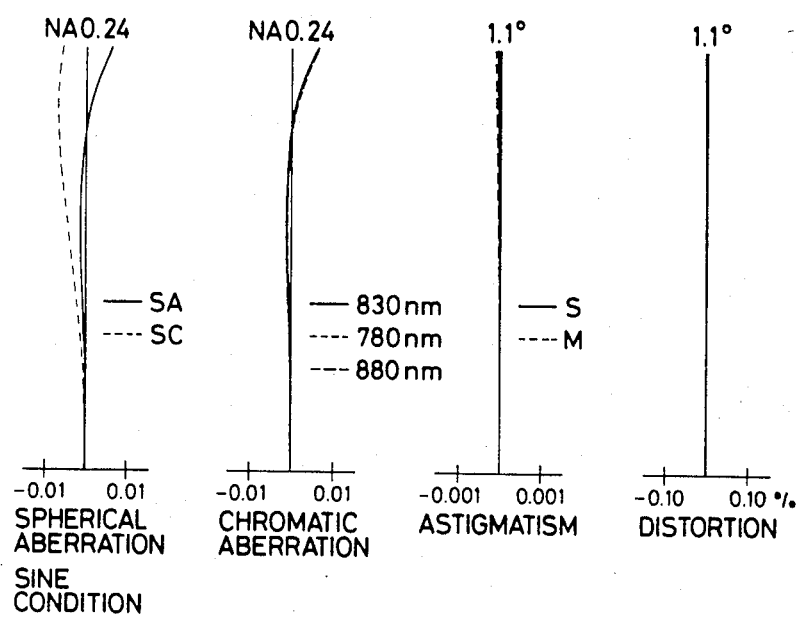
FIG. 8 is a diagram plotting the aberrational curves obtained by the fourth embodiment of the present invention.
Figure 10:
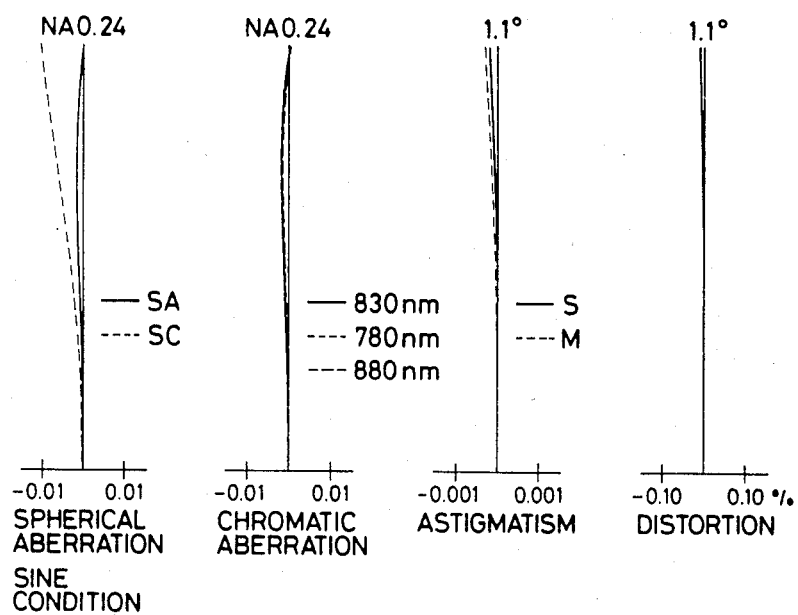
FIG. 10 is a diagram plotting the aberrational curves obtained by the fifth embodiment of the present invention.

The more precise shapes of the lens units are shown in FIGS. 1, 3, 5, 7 and 9 for the corresponding embodiments of Tables 1, 2, 3, 4 and 5 respectively. For each of the five embodiments there is provided a sequentially numbered FIGS. 2, 4, 6, 8 and 10 showing the resultant aberrations of the lens unit of the embodiment. Each of these figures is composed of four different graphs. The first graph shows the spherical aberration (SA) and the sine condition (SC) as a function of the numerical aperture (NA) from 0 to 0.24. The second graph shows the chromatic aberration for the same range of numerical aperture for light of three different wavelengths, 780 nm, 830 nm and 880 nm. The third graph shows the astigmatism for viewing angles between 0° and 1.1° along the sagittal plane (S) and th meridional plane (M). The fourth graph shows the distortion as a function of the same range of viewing angle.

The embodiments are adequately described by the tables and associated aberration curves. The tables also show the resulting change of focal lengths, producing a shift in the focal point, as a function of temperature.

TABLE 1

| | Embodiment 1 | | | |
|---|---|---|---|---|
| i | $r_i$ | $d_i$ | $N_i$ | $\nu_i$ | $\Delta N_i$ |
| 1 | 0.6779 | 0.6336 | 1.61800 | 63.4 | −3.9 |
| 2 | −0.3836 | 0.6300 | 1.80518 | 25.4 | 7.6 |
| 3 | −0.8633 | | | | |

$\nu_+ - \nu_- = 38.0$
$\Delta N_+/\Delta N_- = -0.51$
displacement of focal point due to a change in refraction index = $160.6 \times 10^{-6}/°C$.

TABLE 2

| | Embodiment 2 | | | |
|---|---|---|---|---|
| i | $r_i$ | $d_i$ | $N_i$ | $\nu_i$ | $\Delta N_i$ |
| 1 | 0.7315 | 0.6320 | 1.67790 | 55.3 | 0.6 |
| 2 | −0.3772 | 0.6317 | 1.80518 | 25.4 | 7.6 |

TABLE 2-continued

| | Embodiment 2 | | | |
|---|---|---|---|---|
| i | $r_i$ | $d_i$ | $N_i$ | $\nu_i$ | $\Delta N_i$ |
| 3 | −1.0998 | | | | |

$\nu_+ - \nu_- = 29.9$
$\Delta N_+/\Delta N_- = 0.08$
displacement of focal point due to a change in refraction index = $70.0 \times 10^{-6}/°C$.

TABLE 3

| | Embodiment 3 | | | |
|---|---|---|---|---|
| i | $r_i$ | $d_i$ | $N_i$ | $\nu_i$ | $\Delta N_i$ |
| 1 | 0.5638 | 0.6448 | 1.48749 | 70.1 | −1.1 |
| 2 | −0.3178 | 0.5477 | 1.78472 | 25.7 | 7.2 |
| 3 | −0.5824 | | | | |

$\nu_+ - \nu_- = 44.4$
$\Delta N_+/\Delta N_- = -0.15$
displacement of focal point due to a change in temperature = $84.2 \times 10^{-6}/°C$.

TABLE 4

| | Embodiment 4 | | | |
|---|---|---|---|---|
| i | $r_i$ | $d_i$ | $N_i$ | $\nu_i$ | $\Delta N_i$ |
| 1 | 0.7575 | 0.6337 | 1.71700 | 47.9 | −0.4 |
| 2 | −0.3929 | 0.6334 | 1.84666 | 23.9 | 8.9 |
| 3 | −1.2465 | | | | |

$\nu_+ - \nu_- = 24.0$
$\Delta N_+/\Delta N_- = -0.04$
displacement of focal point due to a change in temperature = $104.0 \times 10^{-6}/°C$.

TABLE 5

| | Embodiment 5 | | | |
|---|---|---|---|---|
| i | $r_i$ | $d_i$ | $N_i$ | $\nu_i$ | $\Delta N_i$ |
| 1 | 0.7255 | 0.6323 | 1.67790 | 55.3 | 0.6 |
| 2 | −0.4035 | 0.6311 | 1.84666 | 23.9 | 8.9 |
| 3 | −1.0507 | | | | |

$\nu_+ - \nu_- = 31.4$
$\Delta N_+/\Delta N_- = 0.06$
displacement of focal point due to a change in temperature = $73.7 \times 10^{-6}/°C$.

As described in the foregoing pages, the present invention provides a lens system for use with an optical disk that is composed of a lens unit wherein a positive lens element is cemented to a negative lens element and which satisfies conditions (1) and (2) so that the system will experience the least displacement of focal point and aberrational variations on account of variations in wavelength and temperature. In the five embodiments shown, a numerical aperture (NA) of 0.24 is selected and this can be readily increased by employing a nonspherical positive or negative lens element. The advantages of the present invention will be retained even if the order in which the positive and negative lens elements are arranged is reversed.

What is claimed is:

1. A lens system consisting of a single lens unit comprising a positive lens element and a negative lens element cemented to said positive lens element, said lens elements satisfying the following conditions:
   (1) $\nu_+ - \nu_- > 20$; and
   (2) $\Delta N_+/\Delta N_- < 0.1$ and $\Delta N_- > 0$ wherein $\nu_+$ is the Abbe number of the positive lens element, $\nu_-$ is the Abbe number of the negative lens element, $\Delta N_+$ is the temperature coefficient of the refractive index of the positive lens element, and $\Delta N_-$ is the temperature coefficient of the refractive index of the negative lens element.

2. A lens system as recited in claim 1, wherein said lens unit consists of said positive lens element and said negative lens element.

3. A lens system as recited in claim 2, wherein said positive lens element is a 1-st lens element having radii of curvature $r_1$ and $r_2$, said negative lens element is a 2-nd lens element having radii of curvature $r_2$ and $r_3$, said i-th lens elements having said radii, a thickness $d_i$, said refractive index $N_i$, said Abbe number $\nu_i$ and said temperature coefficient of the refractive index $\Delta N_i$ as in the following table:

| i | $r_i$ | $d_i$ | $N_i$ | $\nu_i$ | $\Delta N_i$ |
|---|-------|-------|-------|---------|--------------|
| 1 | 0.6779 | 0.6336 | 1.61800 | 63.4 | −3.9 |
| 2 | −0.3836 | 0.6300 | 1.80518 | 25.4 | 7.6 |
| 3 | −0.8633 | | | | |

4. A lens system as recited in claim 2, wherein said positive lens element is a 1-st lens element having radii of curvature $r_1$ and $r_2$, said negative lens element is a 2-nd lens element having radii of curvature $r_2$ and $r_3$, said i-th lens elements having said radii, a thickness $d_i$, said refractive index $N_i$, said Abbe number $\nu_i$ and said temperature coefficient of the refractive index $\Delta N_i$ as in the following table:

| i | $r_i$ | $d_i$ | $N_i$ | $\nu_i$ | $\Delta N_i$ |
|---|-------|-------|-------|---------|--------------|
| 1 | 0.7315 | 0.6320 | 1.67790 | 55.3 | 0.6 |
| 2 | −0.3772 | 0.6317 | 1.80518 | 25.4 | 7.6 |
| 3 | −1.0998 | | | | |

5. A lens system as recited in claim 2, wherein said positive lens element is a 1-st lens element having radii of curvature $r_1$ and $r_2$, said negative lens element is a 2-nd lens element having radii of curvature $r_2$ and $r_3$, said i-th lens elements having said radii, a thickness $d_i$, said refractive index $N_i$, said Abbe number $\nu_i$ and said temperature coefficient of the refractive index $\Delta N_i$ as in the following table:

| i | $r_i$ | $d_i$ | $N_i$ | $\nu_i$ | $\Delta N_i$ |
|---|-------|-------|-------|---------|--------------|
| 1 | 0.5638 | 0.6448 | 1.48749 | 70.1 | −1.1 |
| 2 | −0.3178 | 0.5477 | 1.78472 | 25.7 | 7.2 |
| 3 | −1.0998 | | | | |

6. A lens system as recited in claim 2, wherein said positive lens element is a 1-st lens element having radii of curvature $r_1$ and $r_2$, said negative lens element is a 2-nd lens element having radii of curvature $r_2$ and $r_3$, said i-th lens elements having said radii, a thickness $d_i$, said refractive index $N_i$, said Abbe number $\nu_i$ and said temperature coefficient of the refractive index $\Delta N_i$ as in the following table:

| i | $r_i$ | $d_i$ | $N_i$ | $\nu_i$ | $\Delta N_i$ |
|---|-------|-------|-------|---------|--------------|
| 1 | 0.7575 | 0.6337 | 1.71700 | 47.9 | −0.4 |
| 2 | −0.3929 | 0.6334 | 1.84666 | 23.9 | 8.9 |
| 3 | −1.0998 | | | | |

7. A lens system as recited in claim 2, wherein said positive lens element is a 1-st lens element having radii of curvature $r_1$ and $r_2$, said negative lens element is a 2-nd lens element having radii of curvature $r_2$ and $r_3$, said i-th lens elements having said radii, a thickness $d_i$, said refractive index $N_i$, said Abbe number $\nu_i$ and said temperature coefficient of the refractive index $\Delta N_i$ as in the following table:

| i | $r_i$ | $d_i$ | $N_i$ | $\nu_i$ | $\Delta N_i$ |
|---|-------|-------|-------|---------|--------------|
| 1 | 0.7255 | 0.6323 | 1.67790 | 55.3 | 0.6 |
| 2 | −0.4035 | 0.6311 | 1.84666 | 23.9 | 8.9 |
| 3 | −1.0507 | | | | |

* * * * *